United States Patent
Takei et al.

(10) Patent No.: US 12,047,225 B2
(45) Date of Patent: Jul. 23, 2024

(54) NETWORK SYSTEM MANAGEMENT APPARATUS AND METHOD

(71) Applicant: Nippon Telegraph and Telephone Corporation, Tokyo (JP)

(72) Inventors: Yuki Takei, Musashino (JP); Yuta Watanabe, Musashino (JP); Masayuki Nishiki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/022,843

(22) PCT Filed: Aug. 31, 2020

(86) PCT No.: PCT/JP2020/032965
§ 371 (c)(1),
(2) Date: Feb. 23, 2023

(87) PCT Pub. No.: WO2022/044344
PCT Pub. Date: Mar. 3, 2022

(65) Prior Publication Data
US 2023/0308344 A1  Sep. 28, 2023

(51) Int. Cl.
*G06F 15/16* (2006.01)
*H04L 41/0659* (2022.01)

(52) U.S. Cl.
CPC ............. *H04L 41/0661* (2023.05)

(58) Field of Classification Search
CPC .................................. H04L 41/0661

USPC ........................................... 709/220
See application file for complete search history.

(56) References Cited

U.S. PATENT DOCUMENTS

| | | | | |
|---|---|---|---|---|
| 6,680,922 B1* | 1/2004 | Jorgensen | ............... | H04L 47/27 370/328 |
| 6,728,748 B1* | 4/2004 | Mangipudi | ......... | H04L 43/0811 718/105 |
| 7,817,535 B2* | 10/2010 | Pereira | ............... | H04N 21/6405 370/216 |
| 8,160,426 B2* | 4/2012 | Craner | ............. | H04N 21/47214 725/50 |
| 8,854,948 B2* | 10/2014 | Pereira | ............... | H04N 21/6405 370/216 |
| 9,049,141 B2* | 6/2015 | Ferro | .................. | H04L 41/5025 |
| 9,237,070 B2* | 1/2016 | Hill | ........................ | H04L 41/18 |
| 10,491,546 B2* | 11/2019 | Gopalakrishnan | ...... | G06F 9/455 |
| 11,343,137 B2* | 5/2022 | Chandramohan | ... | H04L 41/0668 |
| 11,399,267 B2* | 7/2022 | Natwick | ........... | H04W 72/0453 |

(Continued)

FOREIGN PATENT DOCUMENTS

| | | |
|---|---|---|
| JP | 2009075718 | 4/2009 |
| JP | 2012175391 | 9/2012 |

(Continued)

*Primary Examiner* — Alicia Baturay
(74) *Attorney, Agent, or Firm* — Fish & Richardson P.C.

(57) ABSTRACT

In a network management device, a storage unit stores priority of each of a plurality of users using a network system and a plurality of spare configurations used when a failure occurs in an active edge router, and, when a failure occurs in the active edge router, a setting unit sets each of the plurality of spare configurations to any of a plurality of edge routers included in the network system, in order from a user having higher priority, on the basis of the priority of the user.

7 Claims, 18 Drawing Sheets

(56) References Cited

U.S. PATENT DOCUMENTS

| | | | | |
|---|---|---|---|---|
| 11,665,517 B2* | 5/2023 | Natwick | ............ | H04B 7/18506 |
| | | | | 370/329 |
| 11,729,094 B2* | 8/2023 | Arumugam | ......... | H04L 12/4641 |
| | | | | 709/238 |
| 2021/0058284 A1* | 2/2021 | Chandramohan | ..... | H04L 45/586 |
| 2022/0394011 A1* | 12/2022 | Nakatsukasa | ....... | H04L 61/5014 |
| 2023/0308344 A1* | 9/2023 | Takei | .................. | H04L 41/0668 |

FOREIGN PATENT DOCUMENTS

| | | |
|---|---|---|
| JP | 2013034128 | 2/2013 |
| JP | 2015061229 | 3/2015 |
| JP | 2018137588 | 8/2018 |

* cited by examiner

[Fig. 1]
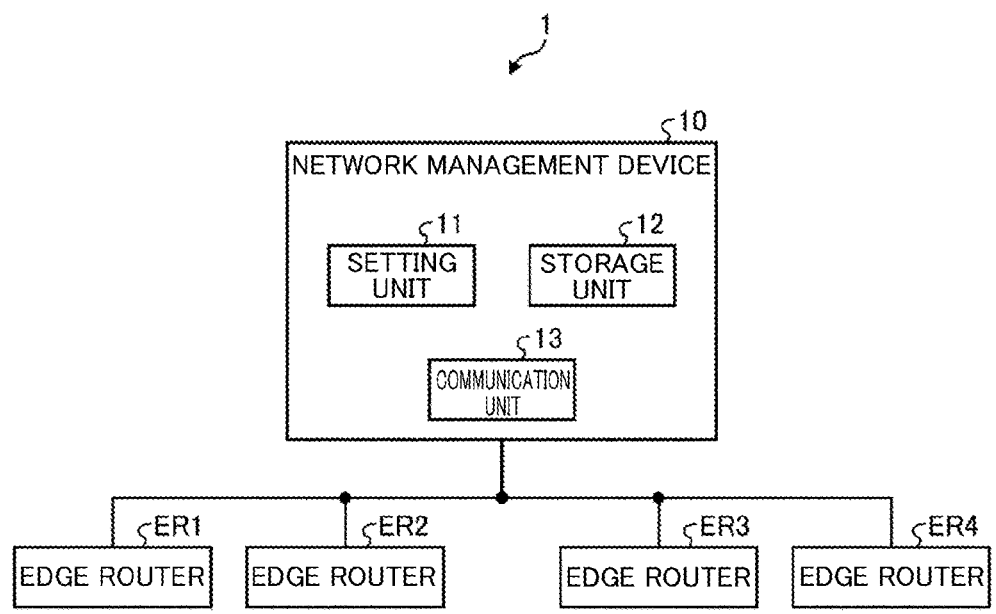

[Fig. 2]
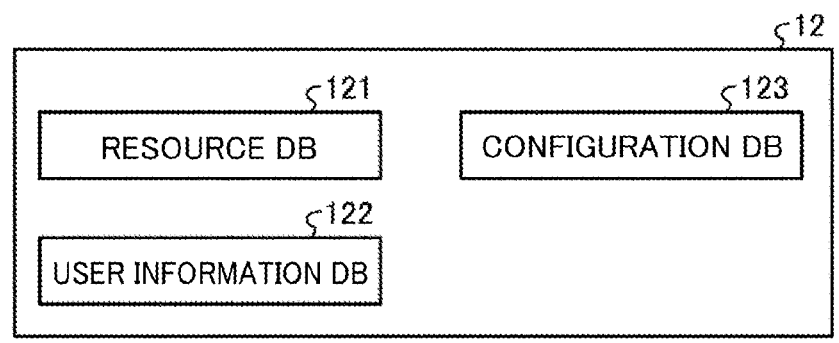

[Fig. 3]

| DEVICE ID | RESOURCE CONSUMPTION | | | REMAINING RESOURCE AMOUNT |
|---|---|---|---|---|
| ER1 | ACTIVE 1C/30% | ACTIVE 2C/40% | ACTIVE 3C/20% | 10% |
| ER2 | ACTIVE 4C/30% | SPARE 1C/30% | SPARE 2C/40% | 0% |
| ER3 | ACTIVE AC/20% | ACTIVE BC/20% | SPARE 3C/20% | 40% |
| ER4 | ACTIVE CC/20% | ACTIVE DC/20% | SPARE 4C/30% | 30% |

| USER NAME | SETTING METHOD | PRIORITY | PRIORITY PLACE |
|---|---|---|---|
| U1 | PRIOR | 2 | NONE |
| U2 | PRIOR | 3 | ALL |
| U3 | PRIOR | 5 | NONE |
| U4 | PRIOR | 1 | ALL |
| UA | DYNAMIC | 4 | AP |
| UB | DYNAMIC | 6 | BP |
| UC | DYNAMIC | 7 | CP |
| UD | DYNAMIC | 8 | DP |

[Fig. 5]
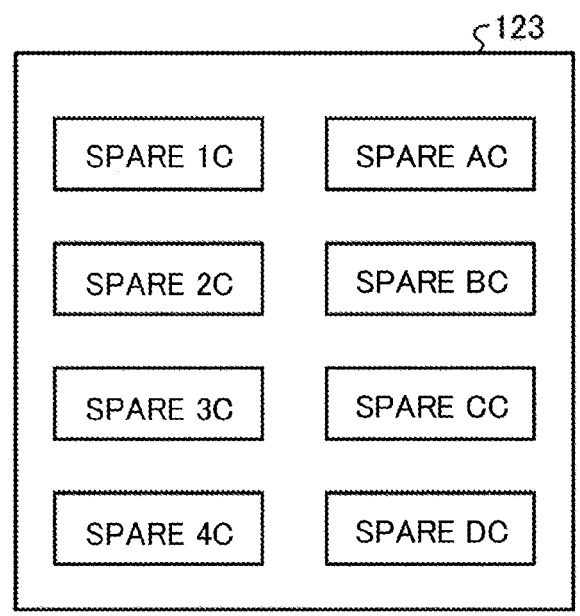

[Fig. 6]
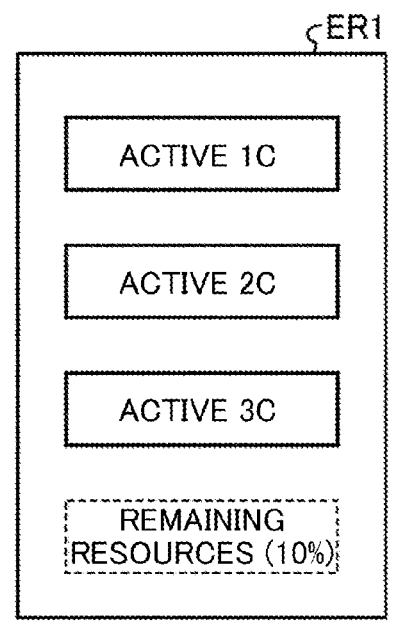

[Fig. 7]
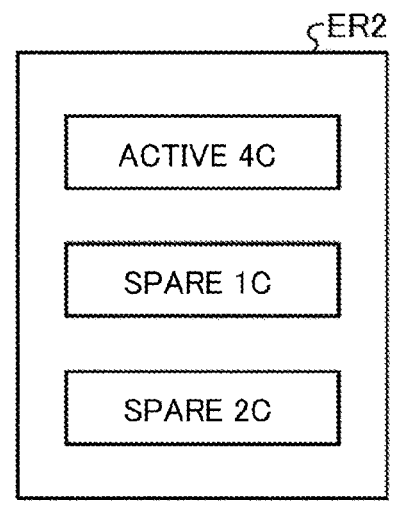

[Fig. 8]
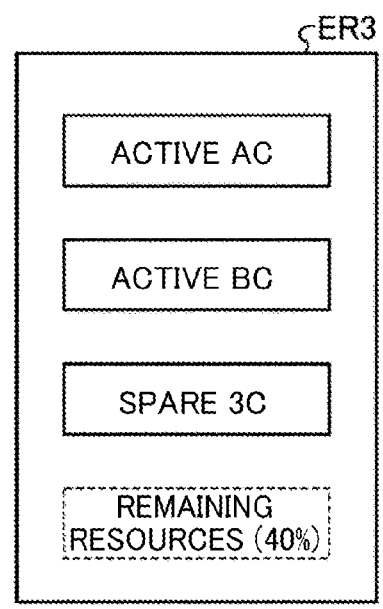

[Fig. 9]
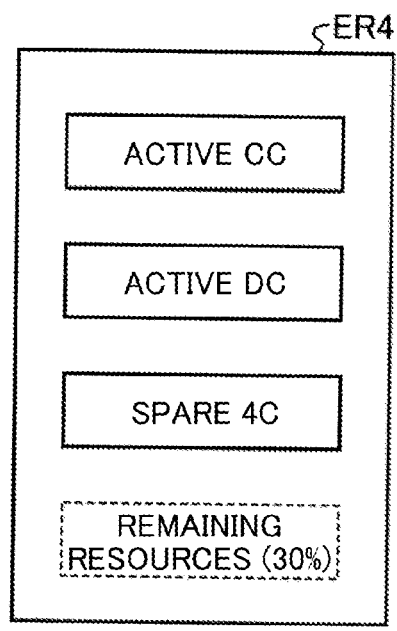

[Fig. 10]
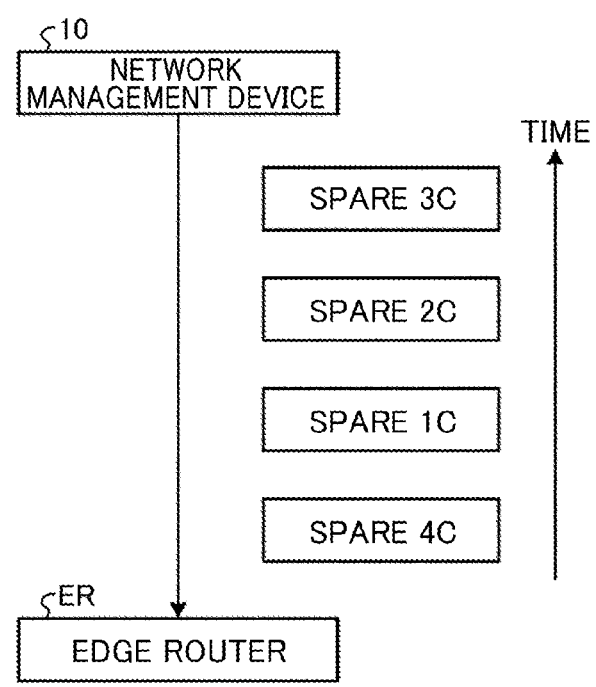

[Fig. 11]
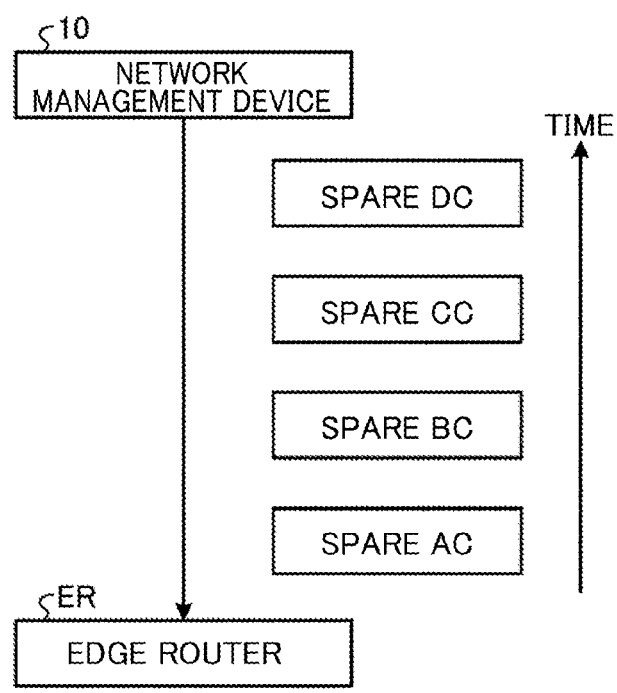

[Fig. 12]
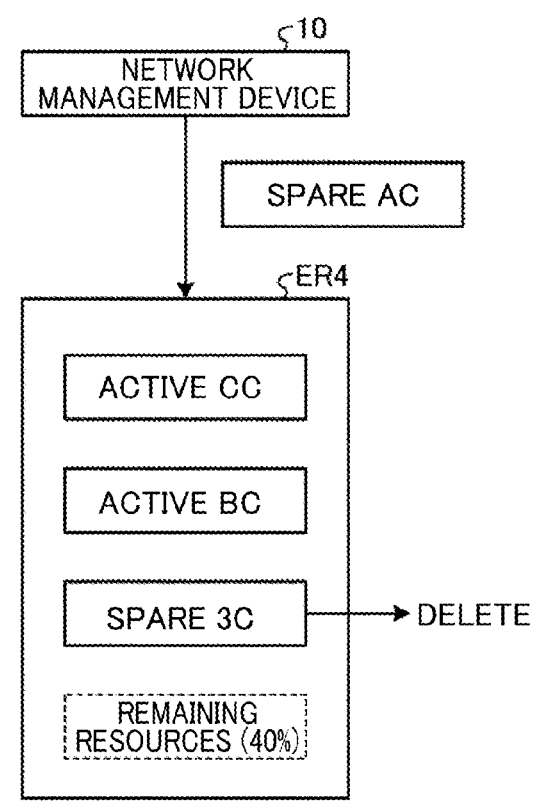

[Fig. 13]
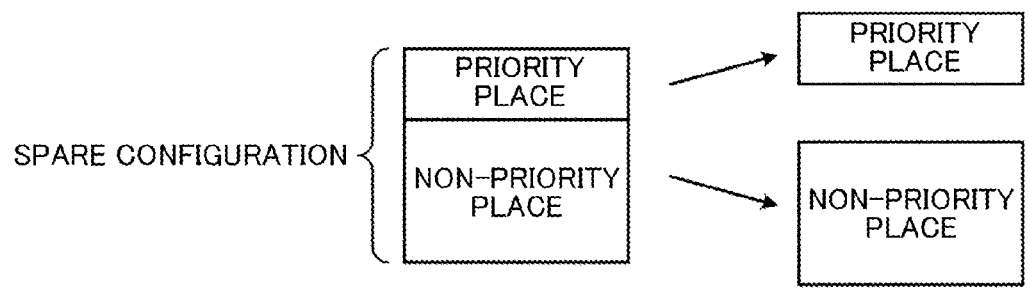

[Fig. 14]
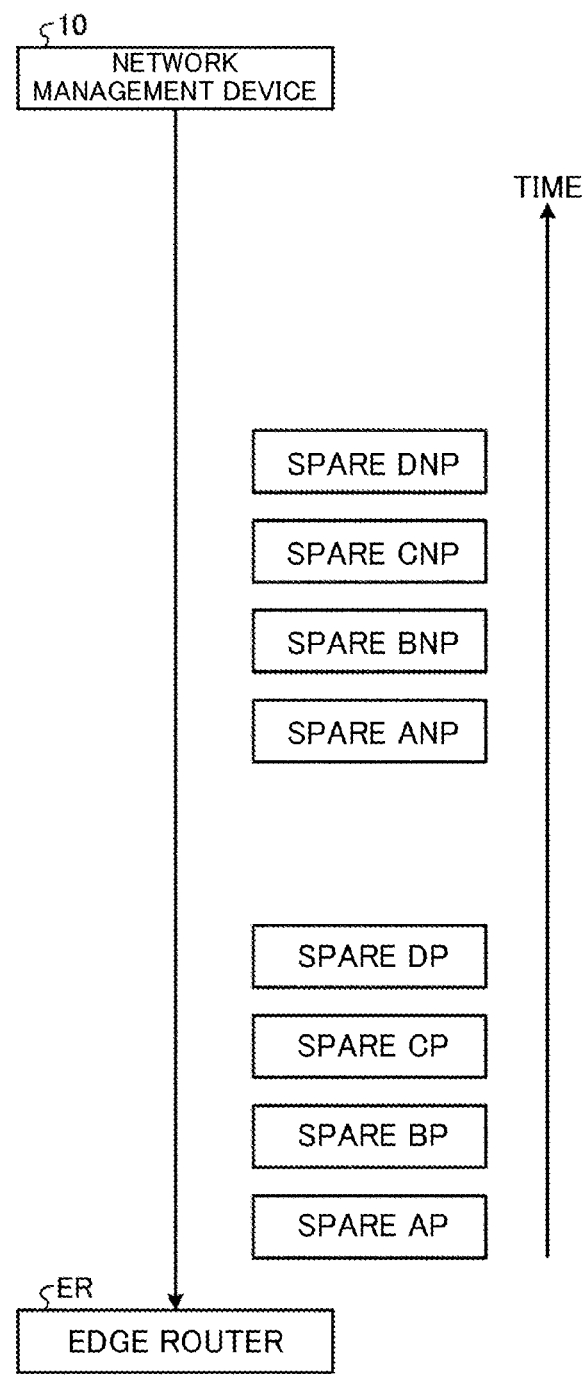

| USER NAME | SETTING METHOD | PRIORITY | PRIORITY PLACE |
|---|---|---|---|
| U1 | PRIOR | 2 | NONE |
| U2 | PRIOR | 3 | ALL |
| U3 | PRIOR | 4 | NONE |
| U4 | PRIOR | 1 | ALL |
| UA | DYNAMIC | 4 | ALL |
| UB | DYNAMIC | 1 | ALL |
| UC | DYNAMIC | 2 | CP |
| UD | DYNAMIC | 3 | DP |

[Fig. 16]
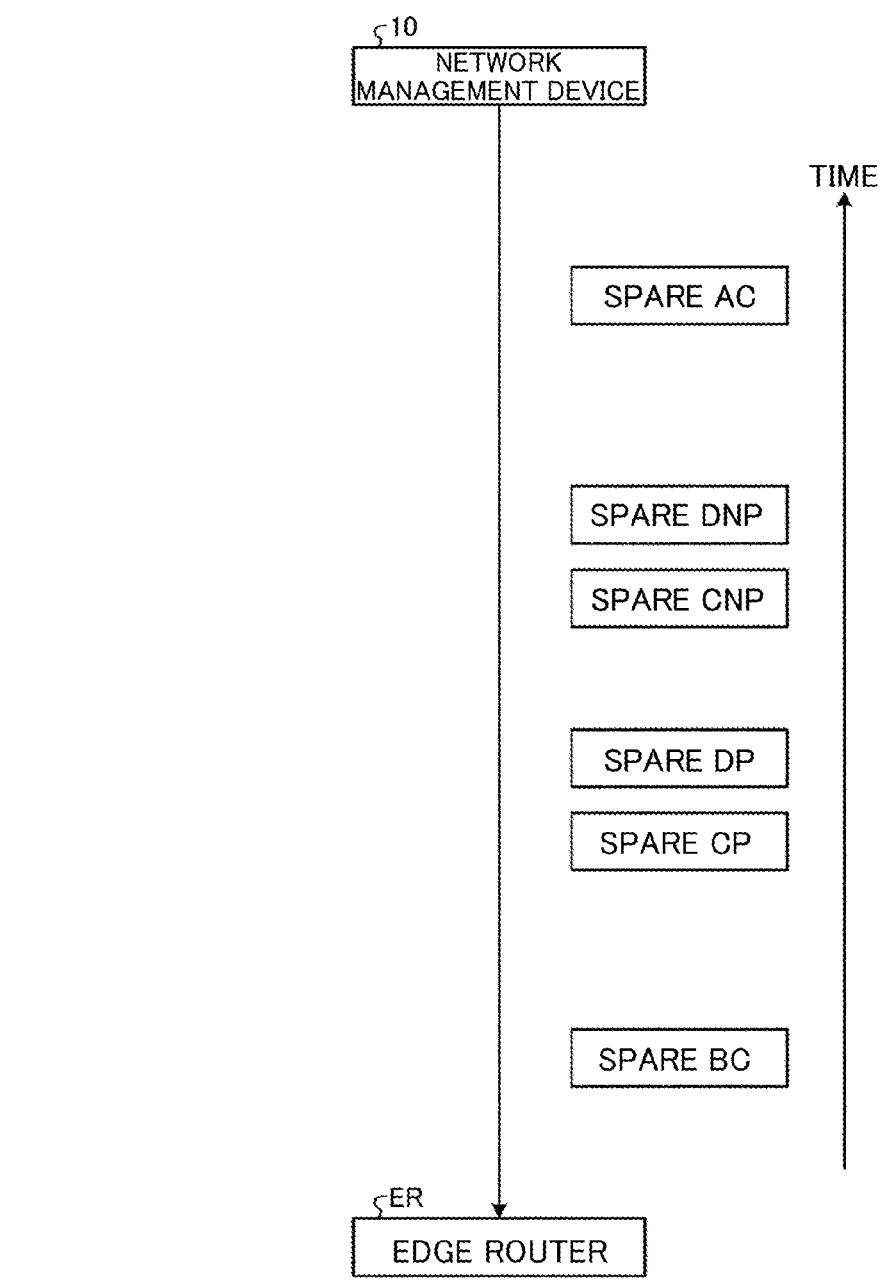

[Fig. 17]
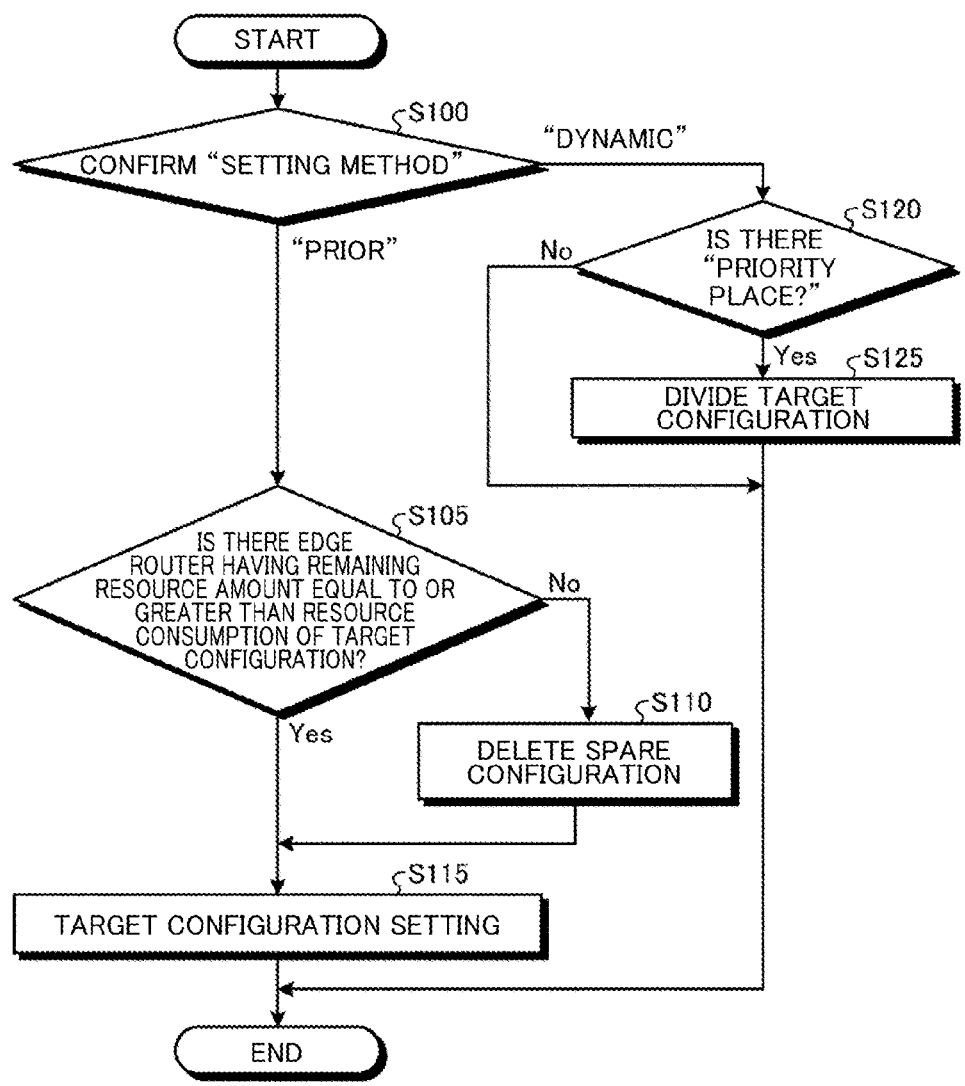

[Fig. 18]
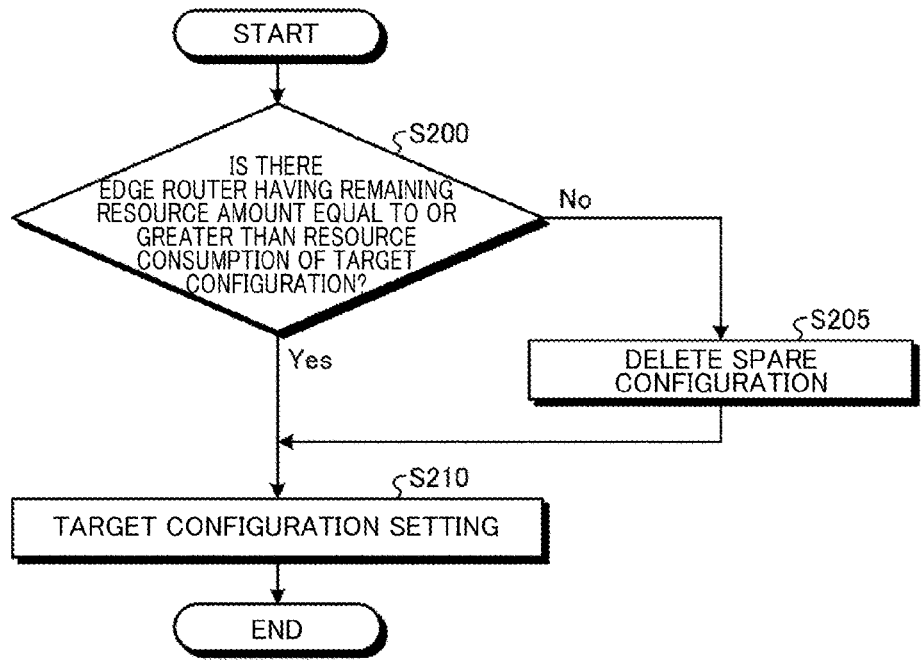

NETWORK SYSTEM MANAGEMENT APPARATUS AND METHOD

CROSS-REFERENCE TO RELATED APPLICATIONS

This application is a National Stage application under 35 U.S.C. § 371 of International Application No. PCT/JP2020/032965, having an International Filing Date of Aug. 31, 2020.

The disclosure of the prior application is considered part of the disclosure of this application, and is incorporated by reference in its entirety into this application.

TECHNICAL FIELD

The present disclosure relates to a management device, a configuration setting method, and a program.

BACKGROUND ART

In a VPN (Virtual Private Network) going through a network of a communication carrier, bases are connected by using an edge router. In addition, in the VPN system, in order to improve the availability of the VPN system, an edge router is made redundant by providing a spare edge router in addition to the active edge router in preparation for the failure of the active edge router. By making the edge router redundant, the path of the VPN can be switched from the active edge router to the spare edge router when a failure occurs in the active edge router, so that the availability of the VPN system is improved.

As a first technique for redundancy of the edge router, there is a technique in which a spare edge router having the same setting as that of the active edge router is prepared in advance before a failure occurs in the active edge router.

As a second technique for redundancy of the edge router, there is a technique for performing the same setting as the setting of the active edge router to the spare edge router when a failure occurs in the active edge router.

CITATION LIST

Patent Literature

[PTL 1] Japanese Patent Application Laid-open No. 2013-034128

SUMMARY OF INVENTION

Technical Problem

In the first technique described above, when a failure occurs in the active edge router, the path of the VPN can be immediately switched from the active edge router to the spare edge router, so that the VPN disconnection time can be shortened. On the other hand, in the first technique described above, since the same number of spare edge routers as the number of active edge routers must be prepared in advance, resources required for redundancy of the edge routers increase.

In the second technique, since the number of spare edge routers is smaller than the number of active edge routers, resources required for redundancy of the edge routers can be reduced as compared with the first technique. On the other hand, in the second technique described above, after the failure of the active edge router is detected, the same setting as the setting of the active edge router in which the failure has occurred is performed in the spare edge router. Therefore, a VPN disconnection time becomes long when making the edge router redundant.

In other words, it is difficult to efficiently make the edge router redundant by either the first technique or the second technique.

Therefore, the present disclosure proposes a technique capable of efficiently performing redundancy of an edge router.

SOLUTION TO PROBLEM

Embodiment

A management device of the present disclosure includes a storage unit and a setting unit. The storage unit stores priority of each of a plurality of users using a network system and a plurality of spare configurations used when a failure occurs in an active edge router. The setting unit sets a predetermined first spare configuration among the plurality of spare configurations to one of a plurality of edge routers included in the network system when no failure occurs in the active edge router. Also, when a failure occurs in an active edge router, the setting unit sets, on the basis of the priority, starting from a user having higher priority, a predetermined second spare configuration among the plurality of spare configurations to any of the plurality of edge routers.

Advantageous Effects of Invention

According to the technique of the disclosure, an edge router can efficiently be made redundant.

BRIEF DESCRIPTION OF DRAWINGS

FIG. 1 is a diagram showing a configuration example of a communication network system according to Example 1 of the present disclosure.

FIG. 2 is a diagram showing a configuration example of a storage unit according to Example 1 of the present disclosure.

FIG. 3 is a diagram showing a configuration example of a resource DB according to Example 1 of the present disclosure.

FIG. 4 is a diagram showing a configuration example of a user information DB according to Example 1 of the present disclosure.

FIG. 5 is a diagram showing a configuration example of a configuration DB according to Example 1 of the present disclosure.

FIG. 6 is a diagram showing a configuration example of an edge router according to Example 1 of the present disclosure.

FIG. 7 is a diagram showing a configuration example of an edge router according to Example 1 of the present disclosure.

FIG. 8 is a diagram showing a configuration example of an edge router according to Example 1 of the present disclosure.

FIG. 9 is a diagram showing a configuration example of an edge router according to Example 1 of the present disclosure.

FIG. 10 is a diagram for explaining an example of an operation of a network management device according to Example 1 of the present disclosure.

FIG. 11 is a diagram for explaining an example of an operation of a network management device according to Example 1 of the present disclosure.

FIG. 12 is a diagram for explaining an example of an operation of a network management device according to Example 1 of the present disclosure.

FIG. 13 is a diagram showing an example of dividing a spare configuration according to Example 2 of the present disclosure.

FIG. 14 is a diagram for explaining an example of an operation of a network management device according to Example 2 of the present disclosure.

FIG. 15 is a diagram showing a configuration example of a user information DB according to Example 3 of the present disclosure.

FIG. 16 is a diagram for explaining an example of an operation of a network management device according to Example 3 of the present disclosure.

FIG. 17 is a flowchart showing an example of a preprocessing procedure in a network management device according to Example 4 of the present disclosure.

FIG. 18 is a flowchart showing an example of a preprocessing procedure in a network management device according to Example 4 of the present disclosure.

DESCRIPTION OF EMBODIMENTS

Examples of the present disclosure will be described hereinafter with reference to the drawings. In the following examples, the same components and steps for performing the same processing are denoted by the same reference numerals.

Example 1

<Configuration of Communication Network System>

FIG. 1 is a diagram showing a configuration example of a communication network system of Example 1 according to the present disclosure. In FIG. 1, a communication network system 1 includes a network management device 10, and edge routers ER1, ER2, ER3, and ER4. Examples of the communication network system 1 include a VPN system, and each base in the VPN is connected via any of the edge routers ER1, ER2, ER3, and ER4. In the following, the edge routers ER1, ER2, ER3, and ER4 may be collectively referred to as "edge router ER."

The network management device 10 includes a setting unit 11, a storage unit 12, and a communication unit 13. The communication unit 13 communicates with the edge router ER. The setting unit 11 is implemented as hardware by, for example, a processor. Examples of the processor include a CPU (Central Processing Unit), a DSP (Digital Signal Processor), and an FPGA (Field Programmable Gate Array). The storage unit 2 is implemented as hardware by, for example, a storage medium. Examples of the storage medium include a memory, an HDD (Hard Disk Drive), and an SSD (Solid State Drive).

<Configuration of Storage Unit>

FIG. 2 is a diagram showing a configuration example of the storage unit of Example 1 according to the present disclosure. In FIG. 2, the storage unit 12 stores a resource DB (database) 121, a user information DB 122, and a configuration DB 123.

FIG. 3 is a diagram showing a configuration example of the resource DB of Example 1 according to the present disclosure. As shown in FIG. 3, a device ID of each edge router ER, a resource consumption of each edge router ER, and a remaining resource amount of each edge router ER are registered in the resource DB 121 in association with each other. In the resource DB 121, "ER1" indicates the device ID of the edge router ER1, "ER2" indicates the device ID of the edge router ER2, "ER3" indicates the device ID of the edge router ER3, and "ER4" indicates the device ID of the edge router ER4.

The "resource consumption" and the "remaining resource amount" in the resource DB 121 are transmitted from each edge router ER to the network management device 10 in response to, for example, an acquisition request transmitted from the setting unit 11 to each edge router ER via the communication unit 13 at a fixed time interval. The setting unit 11 registers the resource consumption and the remaining resource amount of each edge router ER received via the communication unit 13 in the resource DB 121 in association with the device ID.

The following describes, as an example, a case in which the communication network system 1 is used by a plurality of users U1, U2, U3, U4, UA, UB, UC, and UD. In the following, an active configuration for the user U1 may be referred to as "active 1C," a spare configuration for the user U1 as "spare 1C," an active configuration for the user U2 as "active 2C," a spare configuration for the user U2 as "spare 2C," an active configuration for the user U3 as "active 3C," a spare configuration for the user U3 as "spare 3C," an active configuration for the user U4 as "active 4C," and a spare configuration for the user U4 as "spare 4C." Also, in the following, an active configuration for the user UA is referred to as "active AC," a spare configuration for the user UA as "spare AC," an active configuration for the user UB as "active BC," a spare configuration for the user UB as "spare BC," an active configuration for the user UC as "active CC," a spare configuration for the user UC as "spare CC," an active configuration for the user UD as "active DC," and a spare configuration for the user UD as "spare DC." A spare configuration is a configuration used when a failure occurs in an active edge router.

Therefore, the resource DB 121 indicates that 30% of the resources of the edge router ER1 is consumed by the active 1C, 40% by the active 2C, and 20% by the active 3C, and that the remaining resource amount in edge router ER1 is 10%. The resource DB 121 also indicates that 30% of the resources of the edge router ER2 is consumed by the active 4C, 30% by the spare 1C, and 40% by the spare 2C, and that the remaining resource amount in the edge router ER2 is 0%. The resource DB 121 also indicates that 20% of the resources of the edge router ER3 is consumed by the active AC, 20% by the active BC, and 20% by the spare 3C, and that the remaining resource amount in the edge router ER3 is 40%. The resource DB 121 also indicates that 20% of the resources of the edge router ER4 is consumed by the active CC, 20% by the active DC, and 30% by the spare 4C, and that the remaining resource amount in the edge router ER4 is 30%. Therefore, for example, for the user U1, the edge router ER1 is an active edge router and the edge router ER2 is a spare edge router. For example, for the user U4, the edge router ER2 is an active edge router, and the edge router ER4 is a spare edge router.

Since the active AC has already been set in the edge router ER3, the edge routers ER1, ER2, and ER4 are the candidates for the spare edge router for the user UA, so the spare edge router for the user UA is selected from the edge routers ER1, ER2, and ER4. Also, since the active BC has already been set in the edge router ER3, the edge routers ER1, ER2, and ER4 are the candidates for the spare edge router for the user UB, so the spare edge router for the user UB is selected from the edge routers ER1, ER2, and ER4. Also, since the active CC has already been set in the edge router ER4, the edge routers ER1, ER2, and ER3 are the candidates for the spare edge router for the user UC, so the spare edge router for the user UC is selected from the edge routers ER1, ER2, and ER3. Also, since the active DC has already been set in the edge router ER4, the edge routers ER1, ER2, and ER3 are the candidates for the spare edge router for the user UD, so the spare edge router for the user UD is selected from the edge routers ER1, ER2, and ER3.

FIG. 4 is a diagram showing a configuration example of the user information DB of Example 1 according to the present disclosure. A user information DB 122-1 shown in FIG. 4 corresponds to the user information DB 122 shown in FIG. 2. As shown in FIG. 4, in the user information DB 122-1, a user name of each user, a method for setting a spare configuration, a priority of each user, and a priority place in each user configuration are registered as user information in association with each other. The user information in the user information DB 122-1 are registered by an operator in advance based on the contract details of each user for a communication service (e.g., a VPN service) provided by the communication network system 1.

In the item "setting method" in the user information DB 122-1 (FIG. 4), the "prior" indicates that a spare configuration is set in any of the edge routers in advance when no failure occurs in an active edge router (may referred to as "normal times," hereinafter), and "dynamic" indicates that a spare configuration is set in any of the edge routers dynamically on the basis of at least either the priority of each user or the remaining resource amount of each edge router ER when a failure occurs in the active edge router (may referred to as "in the event of a failure," hereinafter).

In the item "priority" in the user information DB 122-1 (FIG. 4), a smaller number indicates a higher priority. That is, the priority of the user U4 is the highest and the priority of the user UD is the lowest.

FIG. 5 is a diagram showing a configuration example of the configuration DB of Example 1 according to the present disclosure. As shown in FIG. 5, spare configurations of the respective spares 1C, 2C, 3C, 4C, AC, BC, CC, and DC are stored in the configuration DB 123 in advance.

<Configuration of Edge Router>

FIGS. 6 to 9 are each a diagram showing a configuration example of an edge router of Example 1 according to the present disclosure. FIG. 6 shows the configuration of the edge router ER1, FIG. 7 shows the configuration of the edge router ER2, FIG. 8 shows the configuration of the edge router ER3, and FIG. 9 shows the configuration of the edge router ER4.

As shown in FIG. 6, in the edge router ER1, as a result of setting the active 1C, the active 2C, and the active 3C in advance, the remaining resource amount is 10%, and the state shown in FIG. 6 is registered in association with the device ID "ER1" in the resource DB 121 (FIG. 3).

As shown in FIG. 7, in the edge router ER2, as a result of setting the active 4C, the spare 1C, and the spare 2C in advance, the remaining resource amount is 0%, and the state shown in FIG. 7 is registered in association with the device ID "ER2" in the resource DB 121 (FIG. 3).

Further, as shown in FIG. 8, in the edge router ER3, as a result of setting the active AC, the spare BC, and the spare 3C in advance, the remaining resource amount is 40%, and the state shown in FIG. 8 is registered in association with the device ID "ER3" in the resource DB 121 (FIG. 3).

Further, as shown in FIG. 9, in the edge router ER4, as a result of setting the active CC, the active DC, and the spare 4C in advance, the remaining resource amount is 30%, and the state shown in FIG. 9 is registered in association with the device ID "ER4" in the resource DB 121 (FIG. 3).

<Operation of Network Management Device>

FIGS. 10, 11, and 12 are each a diagram for explaining an example of an operation of the network management device according to Example 1 of the present disclosure.

Normally, as shown in FIG. 10, the setting unit 11 sets the spare configuration for each of the users U1, U2, U3, and U4, which is registered as "prior" in "setting method" in the user information DB 122-1, to any of the edge routers ER based on the priority of each of the users U1, U2, U3, and U4. At normal times, the setting unit 11 refers to the user information DB 122-1 to acquire the prior of each of the users U1, U2, U3, and U4 from the user information DB 122-1 and acquire the spare configurations of the respective spares 1C, 2C, 3C, and 4C from the configuration DB 123. In the user information DB 122-1, out of the users U1, U2, U3, and U4, the priority of the user U4 is the highest, and the priority is lowered in the order of the users U4, U1, U2, and U3. Thus, the setting unit 11 sets the respective configurations to any of the edge routers ER in the order of the spare 4C, the spare 1C, the spare 2C, and the spare 3C by transmitting the spares 1C, 2C, 3C, and 4C acquired from the configuration DB 123 to any of the edge routers ER by using the communication unit 13 in the order of the spare 4C, the spare 1C, the spare 2C, and the spare 3C.

Also, in normal times, the setting unit 11 selects a spare edge router to which the spare configuration is set from among the edge routers ER1, ER2, ER3, and ER4 based on the remaining resource amount in the edge router ER. For example, when the resource amount consumed by the spare 4C is larger than the remaining resource amount of the edge router ER1 but equal to or less than the remaining resource amount of the edge router ER2, the remaining resource amount of the edge router ER3, and the remaining resource amount of the edge router ER4, the setting unit 11 selects the edge router ER2, the edge router ER3 or the edge router ER4 as the setting destination for the spare 4C. FIG. 3 shows, as an example, a case where the edge router ER4 is selected as the setting destination for the spare 4C and the spare 4C is set in the edge router ER4 at normal times. Also, for example, when the resource amount consumed by the spare 1C is larger than the remaining resource amount of the edge router ER1 and the remaining resource amount of the edge router ER4 after setting of the spare 4C, but is equal to or lower than the remaining resource amount of the edge router ER2 and the remaining resource amount of the edge router ER3, the setting unit 11 selects the edge router ER2 or the edge router ER3 as the setting destination for the spare 1C. FIG. 3 shows, as an example, a case where the edge router ER2 is selected as the setting destination for the spare 1C and the spare 1C is set in the edge router ER2 at normal times. Similarly to the spare 4C and the spare 1C, the setting unit 11 sets the spare 2C to the edge router ER2 and sets the spare 3C to the edge router ER3 at normal times. As a result, the remaining resource amount of each edge router ER at the time when the setting of the spare configuration in the normal times is completed is as shown in FIG. 3.

On the other hand, in the event of a failure, the setting unit 11 sets the spare configuration of each of the users UA, UB, UC, and UD registered as "dynamic" in "setting method" of the user information DB 122-1, to any of the edge routers ER on the basis of the priority of each of the users UA, UB, UC, and UD. In the event of a failure, the setting unit 11 refers to the user information DB 122-1 to acquire the prior of each of the users UA, UB, UC, and UD from the user information DB 122-1 and acquire the spare configurations of the respective spares AC, BC, CC, and DC from the configuration DB 123. In the user information DB 122, out of the users UA, UB, UC, and UD, the user UA has the highest priority, and the priority is lowered in the order of the users UA, UB, UC, and UD. Thus, the setting unit 11 sets the respective configurations to any of the edge routers ER in the order of the spare AC, the spare BC, the spare CC, and the spare DC by transmitting the spares AC, BC, CC, and DC acquired from the configuration DB 123 to any of the edge routers ER by using the communication unit 13 in the order of the spare AC, the spare BC, the spare CC, and the spare DC.

In the event of a failure, the setting unit 11 selects a spare edge router to which the spare configuration is set from among the edge routers ER1, ER2, ER3, and ER4 based on the remaining resource amount in the edge router ER. For example, when the resource amount consumed by the spare AC is larger than the remaining resource amount of the edge router ER1 and the remaining resource amount of the edge router ER2 but equal to or less than the remaining resource amount of the edge router ER3 and the remaining resource amount of the edge router ER4, the setting unit 11 selects the edge router ER4 as the setting destination for the spare AC because the active AC is already set in the edge router ER3. Also, for example, when the resource amount consumed by the spare BC is larger than the remaining resource amount of the edge router ER1, the remaining resource amount of the edge router ER2, and the remaining resource amount of the edge router ER4 after setting of the spare AC, but equal to or less than the remaining resource amount of the edge router ER3, the setting unit 11 selects the edge router ER3 as the setting destination for the spare BC. Similarly to the spare AC and the spare BC, the setting unit 11 sets the spare CC and the spare DC to any of the edge routers in the event of a failure.

Also, for example, when the resource amount consumed by the spare AC is larger than the remaining resource amount of the edge router ER1, the remaining resource amount of the edge router ER2, and the remaining resource amount of the edge router ER4, the setting unit 11 deletes the spare 3C, which is the spare configuration for the user U3 having lower priority than the user UA, from the edge router ER4 as shown in FIG. 12, thereby increasing the remaining resource amount in the edge router ER. As a result of increasing the remaining resource amount of the edge router ER, the remaining resource amount of the edge router ER4 becomes equal to or greater than the resource amount consumed by the spare AC. Thus, the setting unit 11 sets the spare AC to the edge router ER4 after deleting the spare 3C from the edge router ER4.

When a plurality of users having the same priority are registered in the user information DB 122-1, for example, the setting unit 11 may set a spare configuration in the order of contracts of the respective users for the communication service provided by the communication network system 1, in the order of the latest traffic arrival to the edge router ER, or in the order of the lease consumption of the spare configuration.

Example 1 has been described above.

Example 2

<Division of Spare Configuration>

FIG. 13 is a diagram showing an example of dividing a spare configuration according to Example 2 of the present disclosure. As shown in FIG. 13, a spare configuration includes a "priority place" and a "non-priority place" other than the priority place, is divided into the priority place and the non-priority place, and is stored in the configuration DB 123. The priority place is a place where preferential restoration is desired in the spare configuration. The priority place is, for example, a place corresponding to a base or a communication service at which each user desires preferential restoration in the spare configuration, the priority place being registered in the user information DB 122-1 in advance an operator. Examples of the priority place include a place that includes an IP address corresponding to a base of the VPN. In the following, the priority place of the spare AC may be referred to as "spare AP," the non-priority place of the spare AC as "spare ANP," the priority place of the spare BC as "spare BP," the non-priority place of the spare BC as "spare BNP," the priority place of the spare CC as "spare CP," the non-priority place of the spare CC as "spare CNP," the priority place of the spare DC as "spare DP," and the non-priority place of the spare DC as "spare DNP."

<Operation of Network Management Device>

FIG. 14 is a diagram for explaining an example of an operation of a network management device according to Example 2 of the present disclosure.

As shown in FIG. 14, in the event of a failure, out of the spare configurations of the respective users UA, UB, UC, and UD registered as "dynamic" in "setting method" of the user information DB 122-1, the setting unit 11 first sets the spares AP, BP, CP, and DP which are the priority spaces, into the edge router ER in the order of priority of the users UA, UB, UC, and UD (see FIG. 4). After setting the spares AP, BP, CP, and DP, the setting unit 11 sets the spares ANP, BNP, CNP, and DNP, which are the non-priority places, to the edge router ER in the order of priority of the users UA, UB, UC, and UD.

Example 2 has been described above.

Example 3

<Configuration of User Information DB>

FIG. 15 is a diagram showing a configuration example of a user information DB of Example 3 according to the present disclosure. A user information DB 122-2 shown in FIG. 15 corresponds to the user information DB 122 shown in FIG. 2. In the user information DB 122-2 shown in FIG. 15, parts of the "priority" and the "priority place" associated with each user are different from those of the user information DB 122 shown in FIG. 4. For example, in the user information DB 122-1 (FIG. 4), priority "1" to "8" is given to the 8 users U1 to UD, whereas in the user information DB 122-2 (FIG. 15), priority "1" to "4" is given to the users U1, U2, U3, and U4 registered as "prior," and priority "1" to "4" is given to the users UA, UB, UC, and UD registered as "dynamic."

<Operation of Network Management Device>

FIG. 16 is a diagram for explaining an example of an operation of a network management device according to Example 3 of the present disclosure.

As shown in FIG. 16, in the event of a failure, the setting unit 11 sets the spare configurations of the respective users UA, UB, UC, and UD registered as "dynamic" in "setting method" of the user information DB 122-1, to the edge router ER in the order of priority of the users UA, UB, UC, and UD (see FIG. 15). In the user information DB 122-2 (FIG. 15), out of the users UA, UB, UC, and UD, the priority of the user UB is the highest, and the priority is lowered in the order of the users UB, UC, UD, and UA. The entire spare BC is the priority place of the spare BC, and the entire spare AC is the priority place of the spare AC.

Thus, in the event of a failure, the setting unit 11 first sets the entire spare BC in the edge router ER. Next, out of the spare configurations for the respective users UC and UD, the setting unit 11 sets the spares CP and DP, which are priority places, in the edge router ER in the order of priority of the users UC and UD. Next, out of the spare configurations for the respective users UC and UD, the setting unit 11 sets the spares CNP and DNP, which are non-priority places, in the edge router ER in the order of priority of the users UC and UD. Finally, the setting unit 11 sets the entire spare AC to the edge router ER.

Example 3 has been described above.

Example 4

<Processing Procedure in Network Management Device>

FIGS. 17 and 18 are each a flowchart showing an example of a preprocessing procedure in a network management device according to Example 4 of the present disclosure. FIG. 17 shows a processing procedure performed in normal times, and FIG. 18 shows a processing procedure performed in the event of a failure. In the following, user information DBs 122-1 and 122-2 may be collectively referred to as "user information DB 122."

[Program and Recording Medium]

<Processing Procedure Performed in Normal Times (FIG. 17)>

The flowchart shown in FIG. 17 is repeated for all users in order from the user having higher priority. For example, when the user information DB 122-1 (FIG. 4) is stored in the storage unit 12, the flowchart shown in FIG. 17 is repeated eight times total for each of the eight users U1, U2, U3, U4, UA, UB, UC, and UD in order of the users U4, U1, U2, UA, U3, UB, UC, and UD.

In step S100, the setting unit 11 refers to the user information DB 122 to check the "setting method" that has been set for the user to whom a stare configuration is set (may be referred to as "target user," hereinafter). When the "setting method" of the target user is "prior," the processing proceeds to step S105, and when the "setting method" of the target user is "dynamic," the processing proceeds to step S120.

In step S105, the setting unit 11 refers to the resource DB 121 to determine whether or not an edge router having a remaining resource amount equal to or greater than the resource consumption of the spare configuration for the target user (may be referred to as "target configuration," hereinafter) exists in edge routers connected to the network management device 10, the edge router being an edge router in which the target configuration can be set (may be referred to as "settable edge router," hereinafter). When the settable edge router does not exist, that is, when there is no remaining resource amount for which the target configuration can be set does not exist in all edge routers connected to the network management device 10 (step S105: No), the processing proceeds to step S110, and when the settable edge router exists (step S105: Yes), the processing proceeds to step S115 without having the processing of step S110 executed.

In step S110, the setting unit 11 refers to the resource DB 121, and deletes the spare configuration that has already been set in the edge router having a remaining resource amount less than the resource consumption of the target configuration, the edge router being an edge router in which the target configuration cannot be set (may be referred to as "non-settable edge router," hereinafter). As described in Example 1, the setting unit 11 deletes the spare configuration from the non-settable edge router on the basis of the priority of the user. The setting unit 11 repeats the processing of step S110 until any of the non-settable edge routers changes to a settable edge router.

In step S115, the setting unit 11 sets the target configuration to a settable edge router. The control unit 4 ends the processing in FIG. 5 after the processing of step S115.

On the other hand, in step S120, the setting unit 11 refers to the user information DB 122 to determine whether or not a "priority place" set for the target user exists. When the "priority place" exists (step S120: Yes), the processing proceeds to step S125, and when the "priority place" does not exist (step S120: No), the processing is ended without having the processing of step S120 executed.

In step S125, the setting unit 11 divides the target configuration into a priority place and a non-priority place, and stores the divided priority place and non-priority place in the configuration DB 123. The processing is ended after the processing of step S125.

<Processing Procedure Upon Failure (FIG. 18)>

The flowchart shown in FIG. 18 is repeatedly performed for each user in order from the user having higher priority, with a user having "setting method" registered as "dynamic" among all users registered in the user information DB 122, as a target user. For example, when the user information DB 122-1 (FIG. 4) is stored in the storage unit 12, the flowchart shown in FIG. 17 is performed four times total for each of the four users UA, UB, UC, and UD in order of the users UA, UB, UC, and UD.

In step S200, the setting unit 11 refers to the resource DB 121 to determine whether or not a settable edge router exists in edge routers connected to the network management device 10. When a settable edge router does not exist (step S200: No), the processing proceeds to step S205, and when a settable edge router exists (step S200: Yes), the processing proceeds to step S210 without having the processing of step S205 executed.

In step S205, the setting unit 11 refers to the resource DB 121 and deletes the spare configuration that has already been set in the non-settable edge router, in the same manner as the above-described processing in step S110 (FIG. 17).

In step S210, the setting unit 11 sets the target configuration to the settable edge router. In step S210, the setting unit 11 sets the priority place of the target configuration to the settable edge router prior to the non-priority place of the target configuration as shown in, for example, FIG. 14 or FIG. 16, and sets the non-priority place in the settable edge router after setting the priority place. The processing is ended after the processing of step S210.

Example 4 has been described above.

Example 5

All or part of each processing by the setting unit 11 as described above may be realized by causing the setting unit 11 to execute a program corresponding to each process. For example, a program corresponding to each processing described above may be stored in the storage unit 12 and may be read from the storage unit 12 and executed by the setting unit 11. The programs are stored in a program server connected to the network management device 10 via an arbitrary network, downloaded from the program server to the network management device 10 and executed, or the programs may be stored in a recording medium readable by the network management device 10, read from the recording medium and executed. Examples of the recording medium readable by the network management device 10 include a memory card, a USB memory, an SD card, a flexible disk, a magneto-optical disk, a CD-ROM, a DVD, a Blu-ray Cl disk and other portable storage media. The programs are data processing methods written in any language or any description method, and can be in any format such as source code or binary code. In addition, programs are not necessarily limited to those that are composed singly, but also include those that are distributed as a plurality of modules or a plurality of libraries, and those that cooperate with separate programs represented by an OS to achieve their functions.

Example 5 has been described above.

As described above, the management device 10 (the network management device 10 of the examples) of the present disclosure includes the storage unit (the storage unit 12 of the examples) and the setting unit (the setting unit 11 of the examples). The storage unit stores a priority of each of a plurality of users who use a network system (the communication network system 1 of the examples), and a plurality of spare configurations used when a failure occurs in an active edge router. When a failure occurs in the active edge router, the setting unit sets each of the plurality of spare configurations to any of the plurality of edge routers included in the network system, in order of the user having higher priority, on the basis of the priority of the user.

Thus, when making an edge router redundant, and when a failure occurs in the active edge router, it is possible to recover it preferentially from the communication service of the user with high priority, and to perform efficient redundancy in which the disconnection time of the communication service of the user with high priority can be shortened.

The storage unit stores a remaining resource amount of each of the plurality of edge routers. The setting unit selects a spare edge router to which a spare configuration is set, from among the plurality of edge routers, on the basis of the remaining resource amount.

Thus, when making an edge router redundant, efficient redundancy capable of efficiently selecting a spare edge router in which a spare configuration can be set can be performed.

When there is no edge router having a remaining resource amount equal to or greater than the resource consumption of the spare configuration, the setting unit deletes the spare configuration for the user having the lowest priority from the spare edge router.

In this manner, spare configurations for users with high priority can be reliably set in spare edge routers.

In addition, a spare configuration includes a priority place where preferential restoration is desired and a non-priority place other than the priority place, and the setting unit sets the non-priority place after setting the priority place.

Accordingly, the communication service can be efficiently restored when a failure occurs in the active edge router.

REFERENCE SIGNS LIST

1 Communication network system
10 Network management device
11 Setting unit
12 Storage unit
121 Resource DB
122 User information DB
123 Configuration DB
ER Edge router

The invention claimed is:

1. A management device for managing a network system implementing a Virtual Private Network (VPN), comprising:
 a storage medium configured to store a respective priority of each of a plurality of users for using the VPN and a plurality of spare configurations used when a failure occurs in an active edge router; and
 a setting unit, including one or more processors, configured to set, when a failure occurs in an active edge router, each of the plurality of spare configurations to any of a plurality of edge routers included in the network system, on the basis of the respective priority for using the VPN, starting from a user having a higher priority for using the VPN, wherein the spare configuration includes a priority location in the VPN where preferential restoration is desired and a non-priority location other than the priority location, and the setting unit is configured to set the non-priority location after setting the priority location.

2. The management device according to claim 1, wherein the storage medium is configured to store a remaining resource amount of each of the plurality of edge routers, and the setting unit is configured to select a spare edge router in which a spare configuration is set, from among the plurality of edge routers, based on the remaining resource amount.

3. The management device according to claim 2, wherein when an edge router having a remaining resource amount equal to or greater than a resource consumption of the spare configuration does not exist, the setting unit is configured to delete the spare configuration for a user having the lowest priority from the spare edge router.

4. The management device according to claim 1, wherein the priority location in the VPN includes an IP address corresponding to a base of the VPN.

5. A configuration setting method for managing a network system implementing a Virtual Private Network (VPN), comprising:
 storing a respective priority of each of a plurality of users for using the VPN and a plurality of spare configurations used when a failure occurs in an active edge router;
 setting, when a failure occurs in an active edge router, each of the plurality of spare configurations to any of a plurality of edge routers included in the network system, on the basis of the respective priority for using the VPN, starting from a user having a higher priority for using the VPN, wherein the spare configuration includes a priority location in the VPN where preferential restoration is desired and a non-priority location other than the priority location; and
 setting the non-priority location after setting the priority location.

6. The configuration setting method according to claim 5, comprising:
 storing a remaining resource amount of each of the plurality of edge routers; and
 selecting a spare edge router in which a spare configuration is set, from among the plurality of edge routers, based on the remaining resource amount.

7. The configuration setting method according to claim 6, comprising:
 when an edge router having a remaining resource amount equal to or greater than a resource consumption of the spare configuration does not exist, deleting the spare configuration for a user having the lowest priority from the spare edge router.

* * * * *